United States Patent

Noda et al.

[11] Patent Number: 5,900,959
[45] Date of Patent: May 4, 1999

[54] OPTICAL TRANSMITTER, OPTICAL COMMUNICATION SYSTEM AND OPTICAL COMMUNICATION METHOD

[75] Inventors: Mitsuharu Noda; Setsuo Misaizu, both of Yokohama; Motoyoshi Sekiya; Yasunori Nagakubo, both of Kawasaki, all of Japan

[73] Assignee: Fujitsu Limited, Kawasaki, Japan

[21] Appl. No.: 08/763,110

[22] Filed: Dec. 10, 1996

[30] Foreign Application Priority Data

Aug. 20, 1996 [JP] Japan .................................. 8-218600

[51] Int. Cl.$^6$ ...................................................... H04B 10/04
[52] U.S. Cl. ............................. 359/180; 359/187; 359/188
[58] Field of Search .................................... 359/153, 161, 359/173, 187, 188, 124, 127, 180; 372/26, 29, 32

[56] References Cited

U.S. PATENT DOCUMENTS

| | | | |
|---|---|---|---|
| 4,560,246 | 12/1985 | Cotter | 385/27 |
| 5,315,426 | 5/1994 | Aoki | 359/180 |
| 5,329,396 | 7/1994 | Fishman et al. | 359/173 |
| 5,442,473 | 8/1995 | Biotteau | 359/124 |

FOREIGN PATENT DOCUMENTS

| | | |
|---|---|---|
| 0 504 834 | 9/1992 | European Pat. Off. . |
| 8-006078 | 1/1996 | Japan . |

OTHER PUBLICATIONS

JP Patent Abstract No. 4–188686, (Jul. 7, 1992).

*Primary Examiner*—Thomas Mullen
*Attorney, Agent, or Firm*—Staas & Halsey

[57] ABSTRACT

An optical transmitter comprises a first unit for generating an optical signal having a bandwidth given by a main signal, a second unit modulating the optical signal according to a control signal to extend the bandwidth of the optical signal, a third unit extracting backward light including SBS (stimulated Brillouin scattering) light generated in an optical fiber transmission line, and a fourth unit performing feedback control so that the power of the SBS light becomes substantially constant. Through the structure of the optical transmitter good transmission characteristics of a main signal are obtained and the suppression of the SBS is allowed.

12 Claims, 12 Drawing Sheets

OPTICAL TRANSMITTER, OPTICAL COMMUNICATION SYSTEM AND OPTICAL COMMUNICATION METHOD

BACKGROUND OF THE INVENTION

1. Field of the Invention

The present invention relates generally to suppression of stimulated Brillouin scattering occurring in an optical fiber transmission line, and more particularly to an optical transmitter, an optical communication system, and an optical communication method allowing such suppression.

2. Description of the Related Art

In recent years, an optical signal with high power and less chirping has been attainable by using an optical amplifier and an external optical modulator. In transmitting such a high-power coherent optical signal through an optical fiber transmission line, there occurs stimulated Brillouin scattering (SBS) in the fiber, causing a degradation in receiving sensitivity. Accordingly, any countermeasures against SBS are desired.

Conventionally known is an optical transmitter such that a bias current for inducing laser oscillation is supplied to a laser diode, and a modulating current is superimposed on the bias current to thereby obtain a modulated optical signal.

Also conventionally known is an optical transmitter such that a constant or controlled bias current is supplied to a laser diode, and continuous wave (CW) light output from the laser diode is modulated by an external optical modulator.

Meanwhile, it has been proposed that an optical signal intensity-modulated, for example, is further frequency-modulated (or phase-modulated) in order to suppress SBS. The bandwidth (spectral line width) of the optical signal is extended by the frequency modulation, thereby increasing a threshold value on a nonlinear effect. As a result, SBS is suppressed.

For the frequency modulation of light output from a laser diode, it is effective to superimpose a low-frequency signal on a bias current to be supplied to the laser diode. However, the superimposition of the low-frequency signal on the bias current brings about not only the modulation of the frequency (wavelength) of the optical signal, but also the modulation of the intensity (power) of the optical signal. Such intensity modulation by the low-frequency signal degrades transmission characteristics of a main signal, causing a problem such that long-distance transmission becomes difficult, for example.

SUMMARY OF THE INVENTION

It is therefore an object of the present invention to provide an optical transmitter and an optical communication method which can obtain good transmission characteristics of a main signal and allow the suppression of SBS.

It is another object of the present invention to provide an optical communication system including such an optical transmitter.

According to the present invention, there is provided an optical communication system comprising an optical transmitter, an optical receiver, and an optical transmission line for connecting the optical transmitter and the optical receiver. The present invention is characterized especially by the optical transmitter. The optical transmitter comprises four units. The first unit generates an optical signal having a bandwidth given by a main signal. The second unit receives a control signal and modulates the optical signal according to the control signal to thereby extend the bandwidth. The third unit is operatively connected to the optical transmission line and the first unit. The third unit supplies the optical signal to the optical transmission line and extracts backward light including stimulated Brillouin scattering light generated in the optical transmission line. The fourth unit receives the backward light and generates the above control signal so that the power of the stimulated Brillouin scattering light becomes substantially constant.

In this application, the wording that an element and another element are operatively connected includes the case that these elements are directly connected, and also includes the case that these elements are so provided as to be related with each other to such an extent that an electrical signal or an optical signal can be mutually transferred between these elements.

According to the present invention, the bandwidth of the optical signal is extended according to the control signal. Therefore, it is possible to set proper conditions allowing good transmission characteristics of the main signal and the suppression of SBS. That is, undue extension of the bandwidth of the optical signal to such an excess extent for the suppression of SBS can be prevented to thereby ensure good transmission characteristics.

In accordance with another aspect of the present invention, there is provided an optical communication method comprising the steps of (a) generating an optical signal having a bandwidth given by a main signal; (b) modulating the optical signal to extend the bandwidth; (c) supplying the optical signal to an optical transmission line; (d) extracting backward light including stimulated Brillouin scattering light generated in the optical transmission line; and (e) controlling the bandwidth to be extended in the step (b) so that a power of the stimulated Brillouin scattering light becomes substantially constant.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
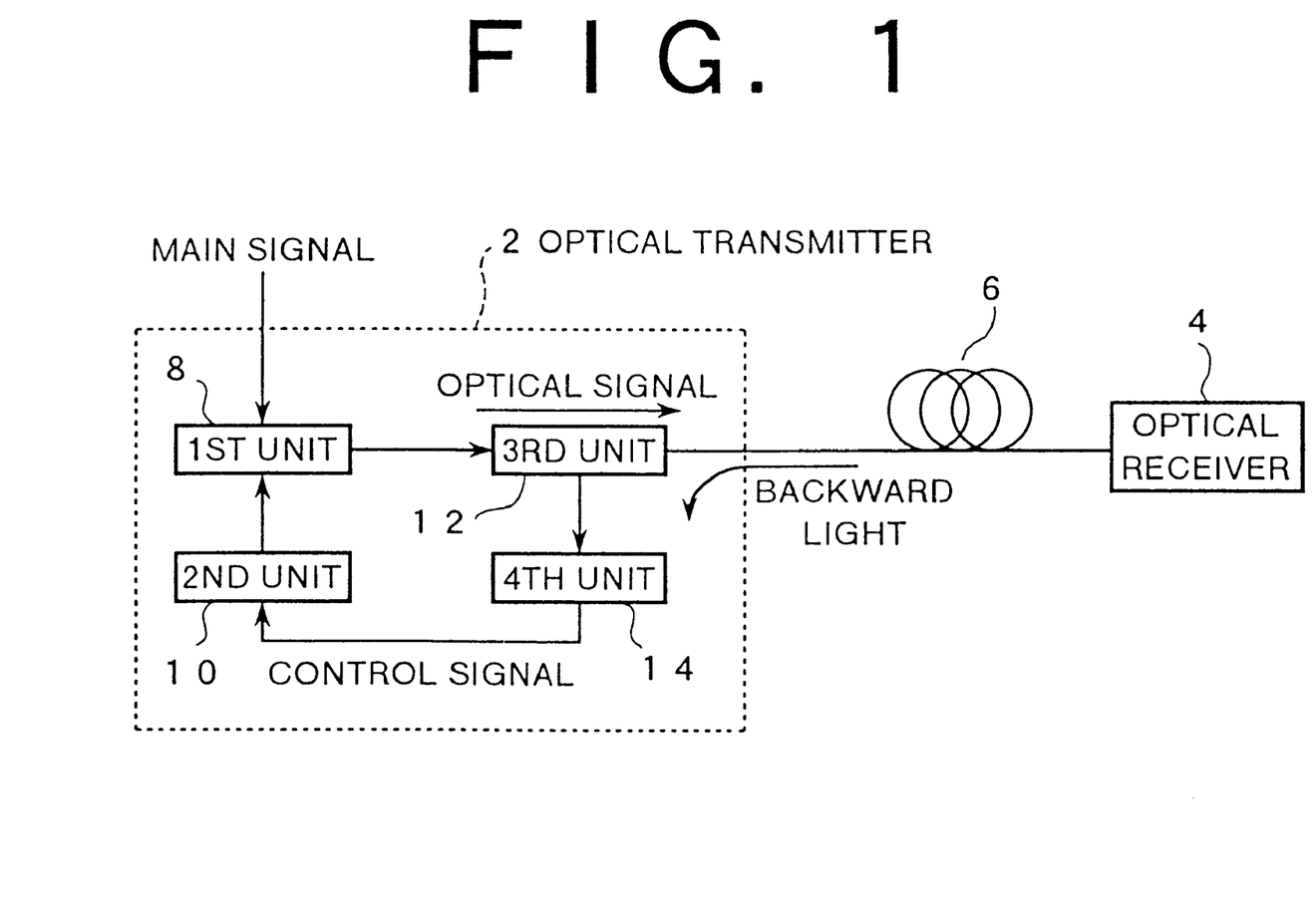
FIG. 1 is a block diagram showing a basic configuration of the optical communication system according to the present invention.

Referring to FIG. 1, there is shown a basic configuration of the optical communication system according to the present invention. This system includes an optical transmitter 2, an optical receiver 4, and an optical fiber transmission line 6 for connecting the optical transmitter 2 and the optical receiver 4.

The configuration and operation of the optical transmitter 2 as a feature of the present invention. A first unit 8 generates an optical signal having a bandwidth given by a main signal. The bandwidth of the optical signal is extended by a second unit 10. The second unit 10 modulates the optical signal according to a control signal to thereby extend the bandwidth. A third unit 12 is operatively connected to the first unit 8 and the optical transmission line 6. The third unit 12 supplies the optical signal from the first unit 8 to the optical fiber transmission line 6, and extracts backward light including stimulated Brillouin scattering light (SBS light) generated in the optical fiber transmission line 6. The backward light is supplied to a fourth unit 14. The fourth unit 14 generates the above-mentioned control signal so that the power of the SBS light generated in the optical fiber transmission line 6 becomes substantially constant, and supplies the control signal to the second unit 10.

Figure 2:
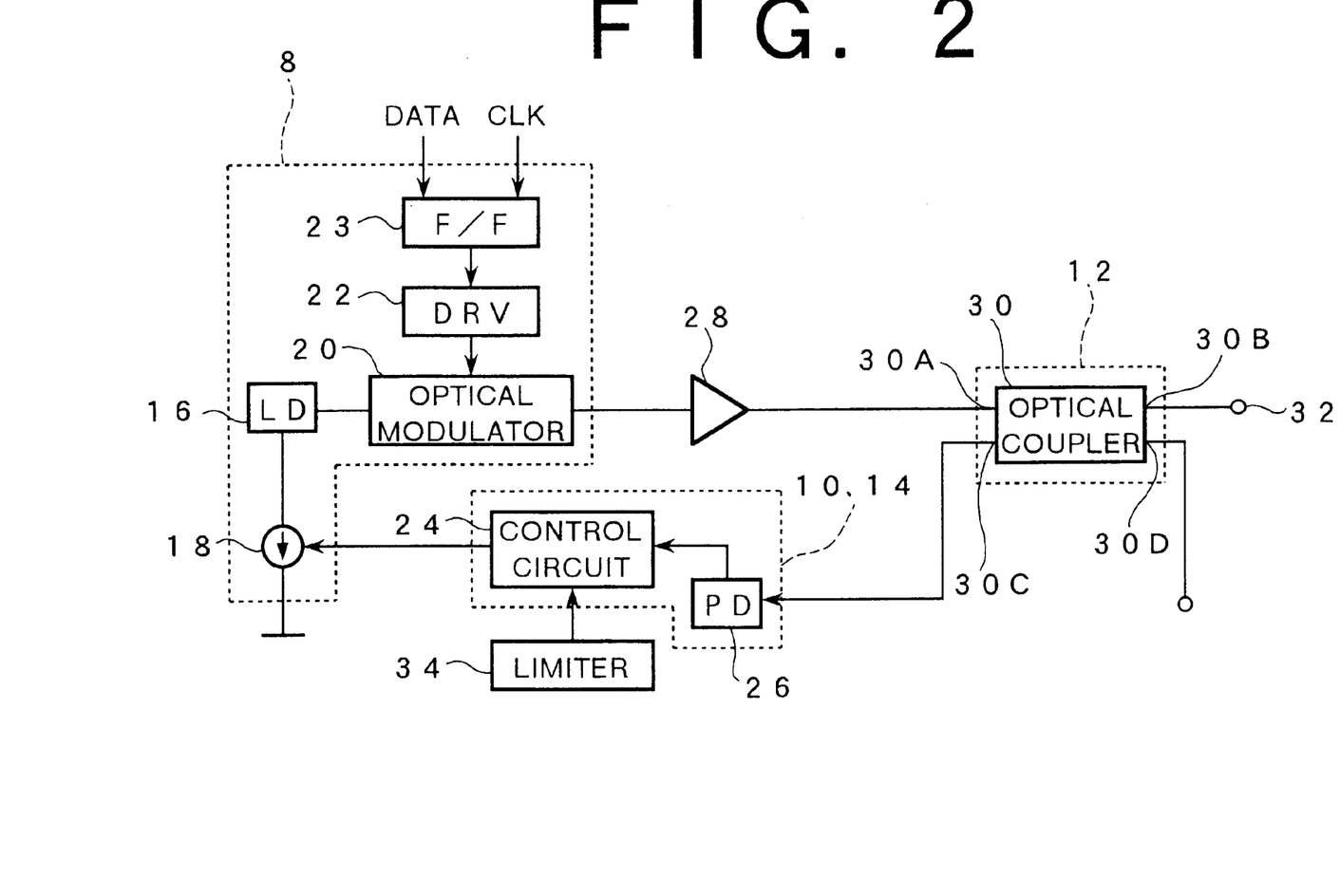
FIG. 2 is a block diagram showing a first preferred embodiment of the optical transmitter according to the present invention.

Referring to FIG. 2, there is shown a first preferred embodiment of the optical transmitter according to the present invention.

The first unit 8 includes a laser diode 16, a constant-current source 18 for supplying a bias current to the laser diode 16 so that the laser diode 16 outputs continuous wave (CW) light, and an optical modulator 20 for intensity-modulating the CW light output from the laser diode 16 to generate an optical signal. The optical modulator 20 is driven by a drive circuit(DRV) 22. A main signal is shaped in a waveform by a flip-flop circuit (F/F) 23 supplied with data (DATA) and clock (CLK), and an output from the flip-flop circuit 23 is supplied to the drive circuit 22.

A control circuit 24 is connected to the constant-current source 18, so as to superimpose a low-frequency signal having a frequency lower than that of the main signal on the bias current to be supplied to the laser diode 16. By the superimposition of the low-frequency signal, the bandwidth of the optical signal to be output from the optical modulator 20 is effectively extended. The amplitude of the low-frequency signal is controlled by a feedback loop employing a photodetector (PD) 26. This feedback loop corresponds to the second unit 10 and the fourth unit 14 shown in FIG. 1.

The optical signal from the optical modulator 20 is amplified by an optical amplifier 28. The optical amplifier 28 comprises of an optical amplifying medium supplied with an optical signal to be amplified and means for pumping the optical amplifying medium. In the case that the optical amplifying medium is provided by a semiconductor chip, the pumping means includes means for injecting an electric current into the semiconductor chip. A doped fiber doped with a rare earth element may also be used as the optical amplifying medium. In this case, the pumping means includes means for supplying to the doped fiber pump light having a wavelength selected according to the dopant and the wavelength of the optical signal. For example, an erbium doped fiber (EDF) is used to amplify an optical signal having a wavelength band of 1.55 $\mu$m. In this case, the wavelength band of the pump light is 0.98 $\mu$m or 1.48 $\mu$m.

The third unit 12 includes an optical coupler 30 having ports 30A, 30B, 30C, and 30D. The optical signal amplified by the optical amplifier 28 is supplied to the port 30A. The port 30B is connected through an output port 32 of this optical transmitter to the optical fiber transmission line 6 (see FIG. 1). The optical signal supplied to the port 30A is divided into two branch light signals, which are individually output from the ports 30B and 30D. Backward light including SBS light generated in the optical fiber transmission line 6 is supplied to the port 30B, and is extracted by the optical coupler 30 and output from the port 30C. The backward light is then supplied to the photodetector 26.

The backward light to be supplied to the port 30B of the optical coupler 30 also includes Fresnel reflected light from an end face of an optical connector or the like (not shown) in addition to the SBS light. To prevent an undesired operation of the feedback loop due to the influence of the Fresnel reflected light, a limiter 34 for limiting the extension of the bandwidth of the optical signal is additionally connected to the control circuit 24.

Figure 3:
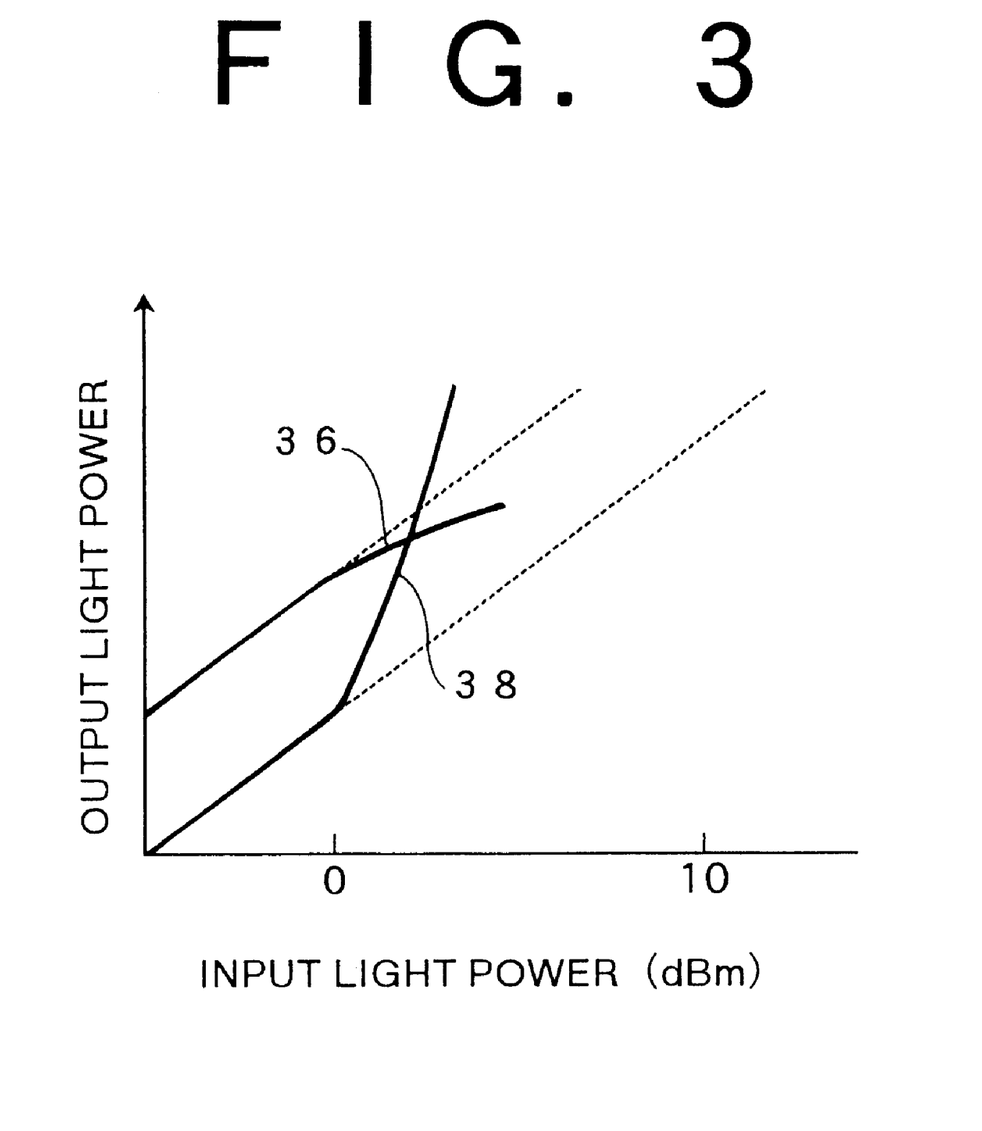
FIG. 3 is a graph for illustrating an increase in backward light due to SBS (stimulated Brillouin scattering)

An increase in backward light due to SBS will now be described with reference to FIG. 3. In FIG. 3, the vertical axis represents output light power in the optical fiber transmission line 6, and the horizontal axis represents input light power (dBm) into the optical fiber transmission line 6. Reference numeral 36 represents the relation between the power of light output from the optical fiber transmission line 6 in a forward direction (a direction from the optical transmitter 2 toward the optical receiver 4) and the input light power into the optical fiber transmission line 6. Reference numeral 38 represents the relation between the power of backward light output from the optical fiber transmission line 6 in a backward direction (a direction from the optical receiver 4 toward the optical transmitter 2) and the input light power into the optical fiber transmission line 6.

In the case that no SBS occurs in the optical fiber transmission line 6, the output light powers both in the forward direction and in the backward direction are proportional to the input light power as shown by broken lines in FIG. 3. Further, the ratio between the output light power in the forward direction and the output light power in the backward direction is substantially constant, because the generation of the backward light is due to Fresnel reflection only in this case.

To the contrary, in the case that SBS occurs in the optical fiber transmission line 6, when the input light power exceeds a certain threshold value, the backward light power rapidly increases and the light power transmittable in the forward direction becomes saturated. Accordingly, although the optical amplifier 28 is used to amplify the optical signal and transmit the amplified optical signal to the optical fiber transmission line 6 as shown in FIG. 2, a transmittable distance is limited. While the threshold value causing the occurrence of SBS depends on the kind of the optical fiber transmission line 6 and the code format of the main signal, the threshold value in the example shown in FIG. 3 is about 0 dBm. This threshold value can be enlarged by the superimposition of the low-frequency signal according to the configuration shown in FIG. 2. This method will now be described more specifically.

The extension of the bandwidth by the low-frequency signal will now be described with reference to FIGS. 4A and 4B. In each of FIGS. 4A and 4B, the vertical axis represents light power, and the horizontal axis represents wavelength.

Figure 4A:
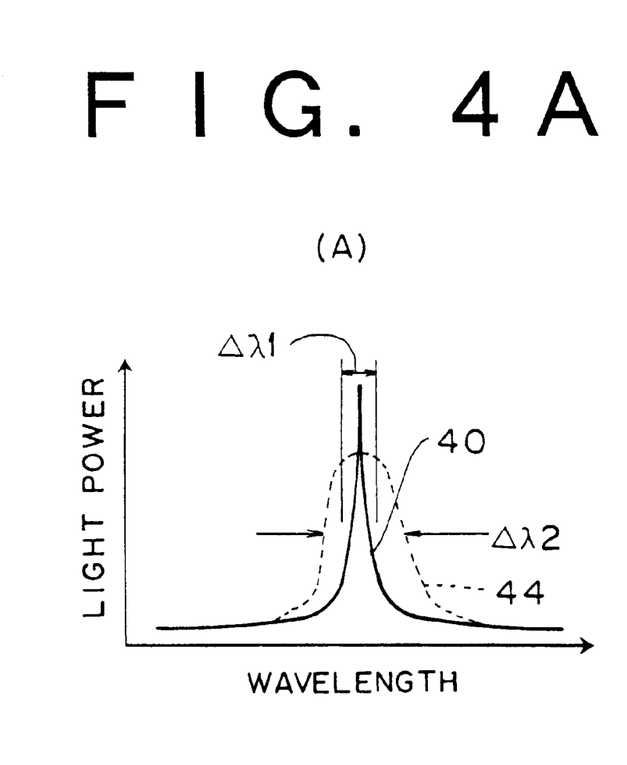
FIGS. 4A and 4B are graphs for illustrating the extension of a bandwidth by a low-frequency signal.
Figure 4B:
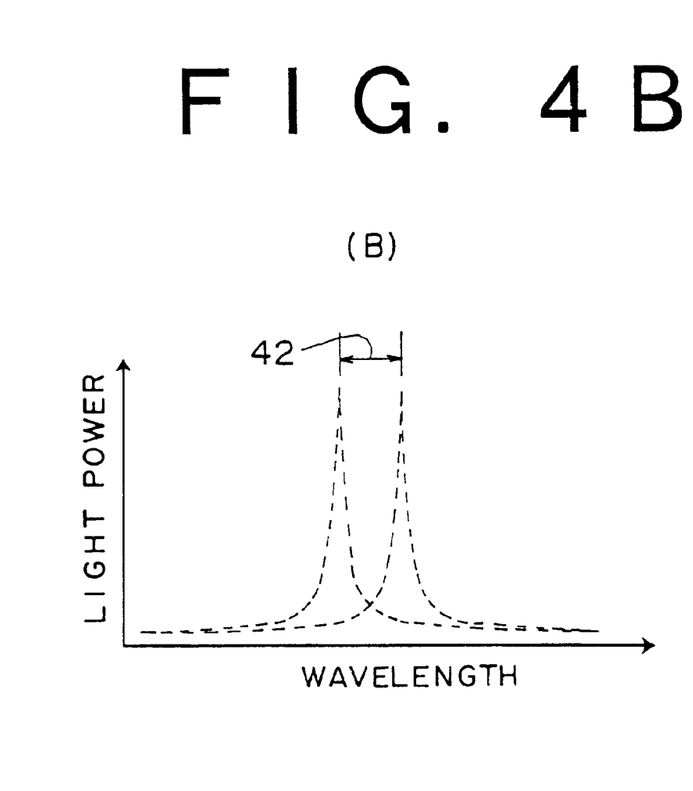

Reference numeral 40 shown in FIG. 4A represents the spectrum of an optical signal output from the optical modulator 20 in the case that the low-frequency signal is not superimposed. The spectrum 40 has a bandwidth $\Delta\lambda 1$ because the optical signal undergoes the intensity modulation by the main signal. It should be understood that the characteristics in such a case of no superimposition of the low-frequency signal are shown in FIG. 3. The superimposition of the low-frequency signal makes a periodical change 42 of a center wavelength of the optical signal according to the low-frequency signal as shown in FIG. 4B. As a result, the bandwidth of the optical signal is extended to $\Delta\lambda 2$ as shown by a reference numeral 44 in FIG. 4A.

Figure 5:
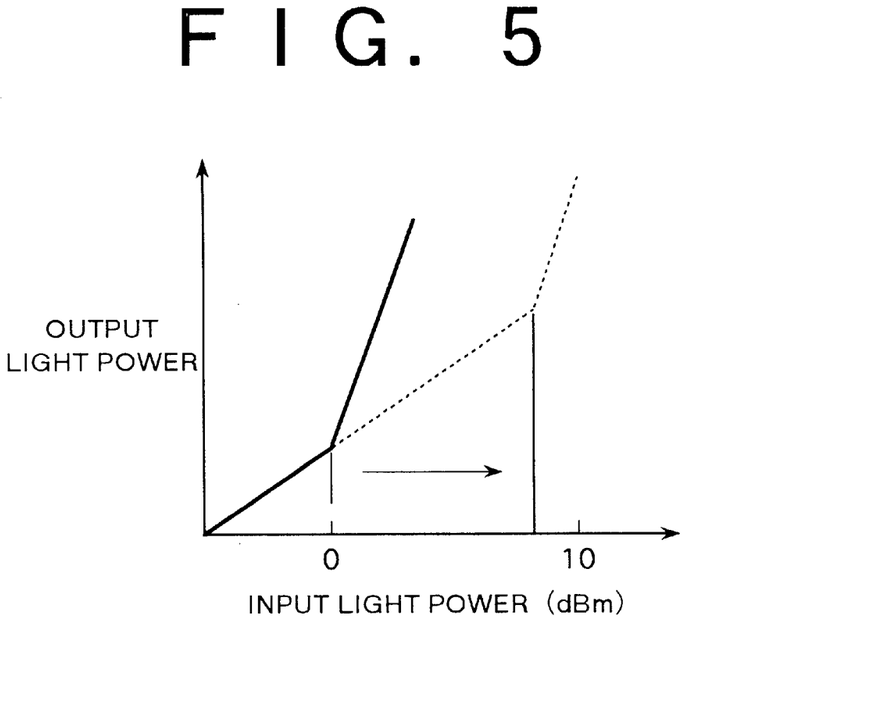
FIG. 5 is a graph for illustrating an increase in threshold value of SBS by the extension of a bandwidth.

The extension of the bandwidth brings about an enlargement of the threshold value causing SBS in the optical fiber transmission line 6 as shown in FIG. 5.

The extension of the bandwidth by the superimposition of the low-frequency signal is based on the fact that the wavelength of the CW light to be output from the laser diode 16 changes with the bias current.

Figure 6:
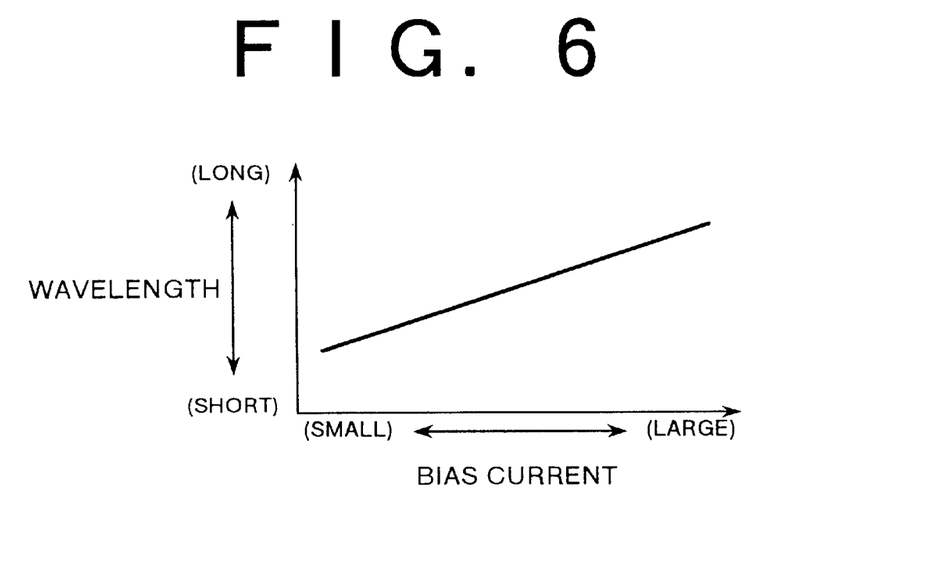
FIG. 6 is a graph showing the relation between wavelength and bias current in a laser diode.

Referring to FIG. 6, there is shown the relation between wavelength and bias current in the laser diode 16. As apparent from FIG. 6, the wavelength increases with an increase in the bias current. It is to be noted herein that not only the wavelength of the CW light to be output from the laser diode 16, but also the power of the CW light changes with the bias current. Accordingly, if the amplitude of the low-frequency signal to be superimposed on the bias current is set excessively large to cause an undue extension of the bandwidth, there occurs waveform interference in the main signal to cause a degradation in bit error rate (BER) in receiving the main signal.

Figure 7:
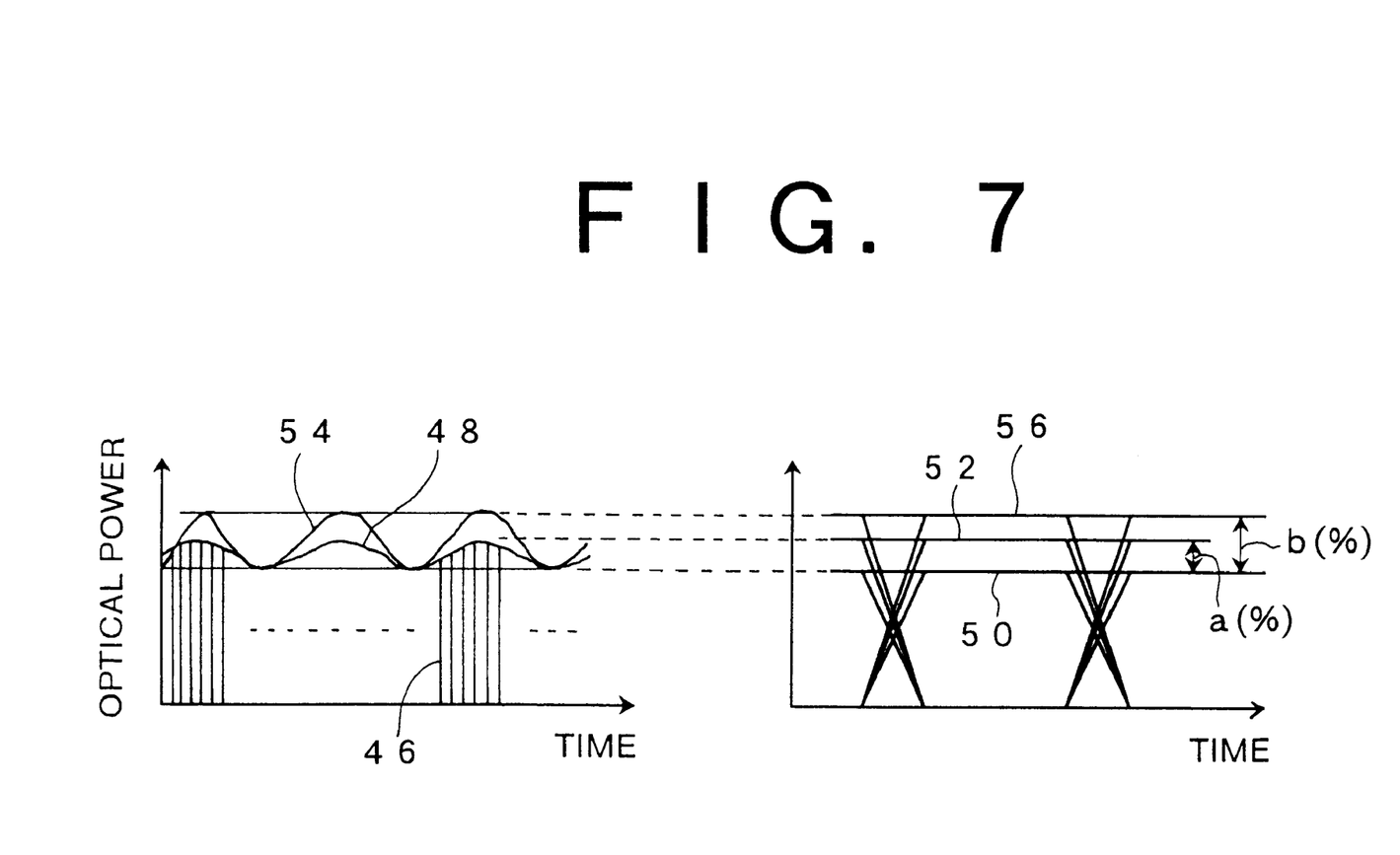
FIG. 7 is an illustration of waveform interference.

Referring to FIG. 7, the graph on the left side shows a waveform of an optical signal, and the graph on the right side shows an eye pattern of a demodulated signal. The waveform of the optical signal is a form such that a low-speed low-frequency component (based on the low-frequency signal) 48 is superimposed on a high-speed main signal component 46. For example, the frequency of the main signal component 46 and the frequency of the low-frequency component 48 are several gigahertz and hundreds of kilohertz, respectively. A change in optical power by the superimposition of the low-frequency component 48 is regarded as a (%) of average light power. In this case, an eye opening in the demodulated signal (NRZ coded, for example) varies in a range between reference numerals 50 and 52.

When the amplitude of the low-frequency signal is enlarged to b (%) as shown by reference numeral 54 and the low-frequency signal having such an enlarged amplitude is superimposed, the eye opening in the demodulated signal correspondingly varies in an increased range between reference numerals 50 and 56. Such variations in eye opening in the increased range cause a problem that a high level of the demodulated signal is prone to become indeterminate, causing a degradation in BER and the occurrence of jitter in reproducing the clock. Such a degradation in BER and the occurrence of jitter resulting in a difficulty of maintaining good transmission characteristics of the main signal.

If good transmission characteristics of the main signal can be obtained and SBS can be effectively suppressed with the waveform interference of a (%), it would be unnecessary to set the amplitude of the low-frequency signal to a larger value, e.g., b (%), and thereby excessively extend the bandwidth of the optical signal.

Figure 8:
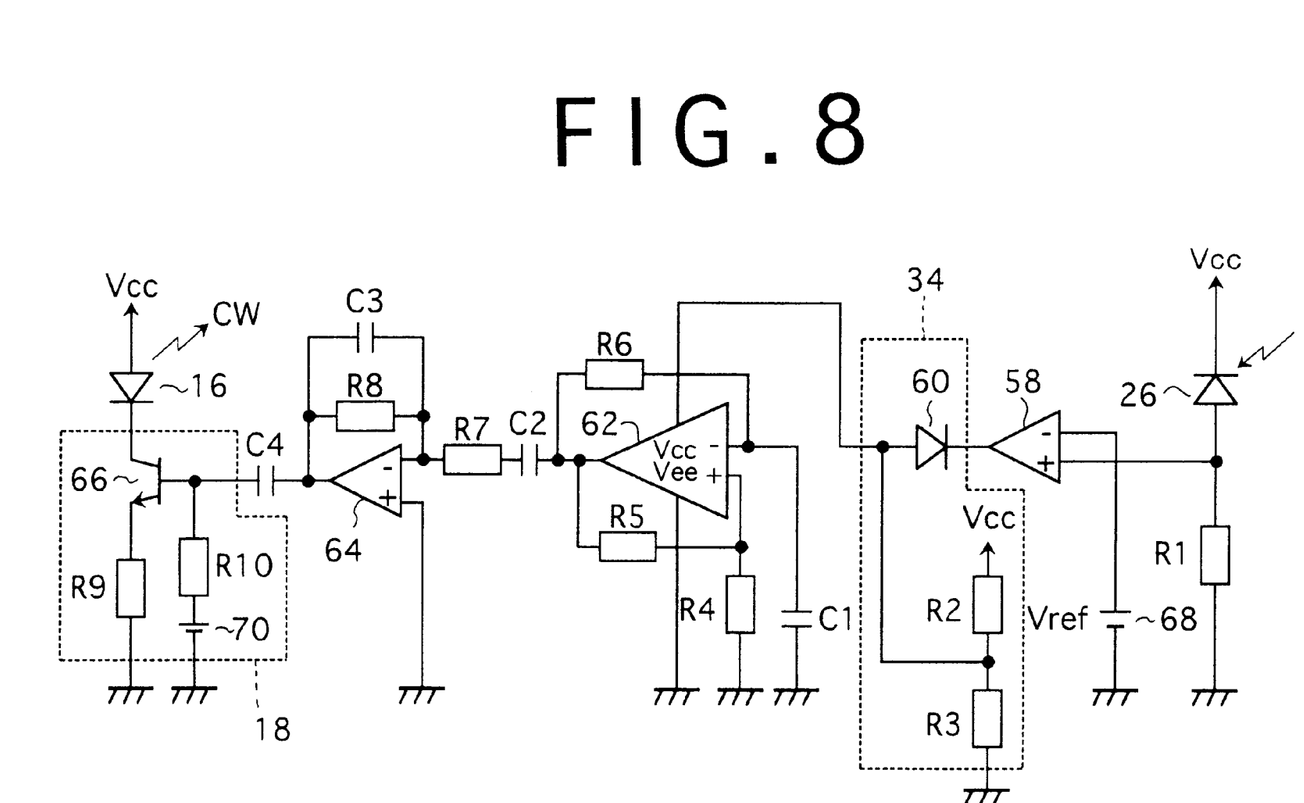
FIG. 8 is a circuit diagram showing a first preferred embodiment of a control circuit shown in FIG. 2.

Referring to FIG. 8 there is shown a first preferred embodiment of the control circuit 24 shown in FIG. 2. In FIG. 8, there are shown an operational amplifier 58 for generating a control signal according to an output signal from a photodetector (photodiode) 26, a limiter 34 employing a diode 60, an astable multivibrator (oscillator) employing an operational amplifier 62, an integrating circuit employing an operational amplifier 64, and a constant-current source 18 employing a transistor 66.

The cathode of the photodetector 26 is connected to a voltage line (Vcc), and the anode of the photodetector 26 is grounded through a resistor R1. A connection point between the photodetector 26 and the resistor R1 is connected to the plus input port of the operational amplifier 58, and the minus input port of the operational amplifier 58 is connected to a voltage source 68 for generating a reference voltage Vref. The output port of the operational amplifier 58 is connected to the cathode of the diode 60, and the anode of the diode 60 is connected to the Vcc power terminal of the operational amplifier 62. The potential of the anode of the diode 60 is maintained constant by resistors R2 and R3. That is, the resistors R2 and R3 are connected in series between the voltage line (Vcc) and the ground, and a connection point between the resistors R2 and R3 is connected to the anode of the diode 60. The Vee power terminal of the operational amplifier 62 is grounded. The minus input port of the operational amplifier 62 is grounded through a capacitor C1, and the plus input port of the operational amplifier 62 is grounded through a resistor R4. A resistor R5 is connected between the plus input port and the output port of the operational amplifier 62, and a resistor R6 is connected between the minus input port and the output port of the operational amplifier 62.

The output port of the operational amplifier 62 is connected through a capacitor C2 and a resistor R7 to the minus input port of the operational amplifier 64. The plus input port of the operational amplifier 64 is grounded. A capacitor C3 and a resistor R8 are connected in parallel between the minus input port and the output port of the operational amplifier 64.

The output port of the operational amplifier 64 is connected through a capacitor C4 to the base of the transistor 66. The collector of the transistor 66 is connected to the cathode of the laser diode 16, and the anode of the laser diode 16 is connected to the voltage line (Vcc). The emitter of the transistor 66 is grounded through a resistor R9. The base of the transistor 66 is connected through a resistor R10 to the plus terminal of a voltage source 70, and the minus terminal of the voltage source 70 is grounded. The voltage source 70 serves to generate a bias current for the laser diode 16.

When backward light including SBS light enters the photodetector 26, a photocurrent responsive to the power of the backward light flows in the photodetector 26, resulting in a change in potential of the anode of the photodetector 26. The potential of the anode is compared with the reference voltage Vref in the operational amplifier 58, and an error signal corresponding to the difference is output from the operational amplifier 58. When the level of the error signal is lower than the potential at the connection point between the resistors R2 and R3, the error signal is supplied as it stands as a control signal to the operational amplifier 62, and a rectangular wave having an amplitude corresponding to the level of the control signal is output from the operational amplifier 62. More specifically, the amplitude of the rectangular wave to be output from the operational amplifier 62 is increased with an increase in the power of the backward light incident on the photodetector 26. Conversely, the amplitude of the rectangular wave is decreased with a decrease in the power of the backward light. Accordingly, the amplitude of the rectangular wave is controlled so that the potential of the anode of the photodetector 26 becomes equal to the reference voltage Vref.

When the level of the error signal to be output from the operational amplifier 58 becomes higher than the potential at the connection point between the resistors R2 and R3, the diode 60 becomes a reversely biased condition, so that the output port of the operational amplifier 58 is cut off from the operational amplifier 62. As a result, a control signal having a constant level is supplied to the operational amplifier 62. In other words, when backward light having a power higher than a predetermined power enters the photodetector 26, the amplitude of the rectangular wave corresponding to the predetermined power is not increased more.

When the rectangular wave whose amplitude has been adjusted as mentioned above is supplied to the operational amplifier 64, a triangular wave having an amplitude responsive to the input amplitude is output from the operational amplifier 64. Then, the triangular wave is supplied as a low-frequency signal to the constant-current source 18. That is, the bias current to be supplied to the laser diode 16 is changed by the triangular wave, and as a result, the wavelength of the CW light to be output from the laser diode 16 changes in synchronism with the triangular wave. At this time, a range of such a change in wavelength of the CW light is controlled according to the control signal to be supplied to the operational amplifier 62. By using the above-mentioned triangular wave as the low-frequency signal, the probability of presence of the optical signal at a given wavelength becomes constant in the bandwidth, thereby effectively suppressing SBS.

Figure 9:
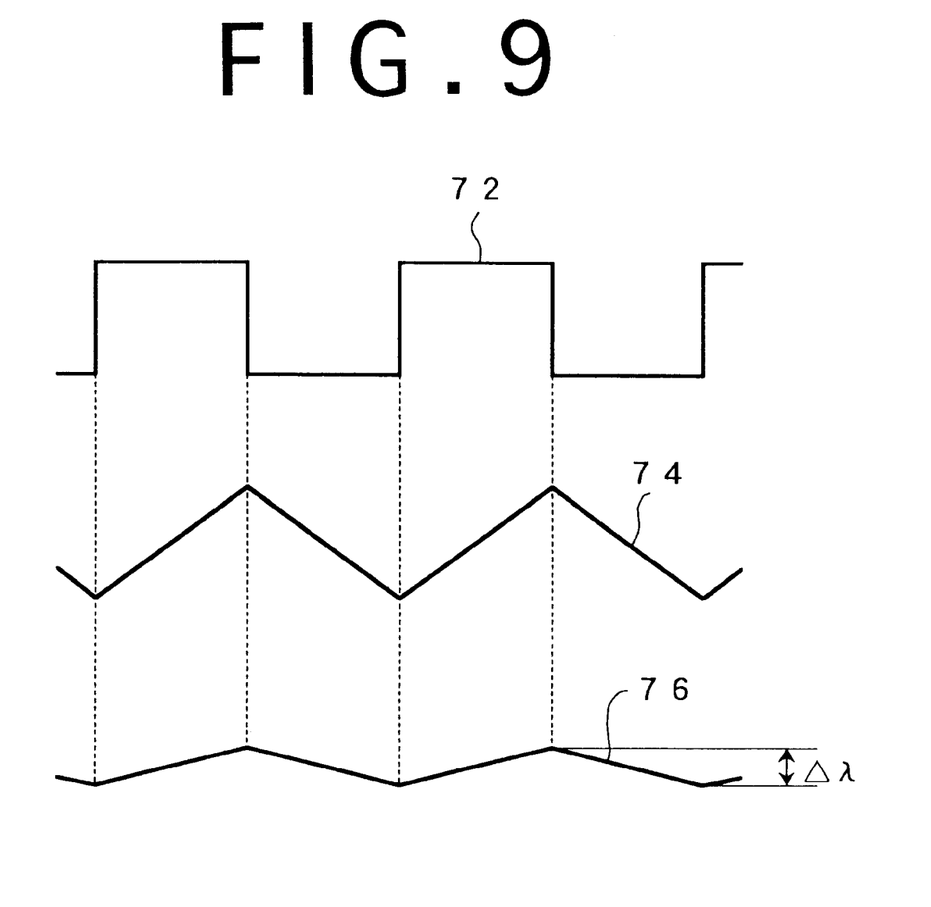
FIG. 9 is a waveform chart in the circuit shown in FIG. 8.

FIG. 9 is a waveform chart by the circuit shown in FIG. 8. Reference numeral 72 represents a waveform of the rectangular wave output from the multivibrator including the operational amplifier 62, and reference numeral 74 represents a waveform of the triangular wave output from the integrating circuit including the operational amplifier 64. By superimposing such a triangular wave on the bias current to be supplied to the laser diode 16, the wavelength of the CW light to be output from the laser diode 16 is changed as shown by a reference numeral 76 according to the triangular wave 74. The range $\Delta\lambda$ of change in the wavelength of the CW light changes with the amplitudes of the rectangular wave 72 and the triangular wave 74. Therefore, by controlling the range $\Delta\lambda$ according to the control signal to be supplied as a power supply for the operational amplifier 62, the bandwidth of the optical signal can be extended to a proper extent. It should be noted that the range $\Delta\lambda$ shown in FIG. 9 corresponds to the range of change in the center wavelength of the optical signal shown by the reference numeral 42 in FIG. 4B

Figure 10:
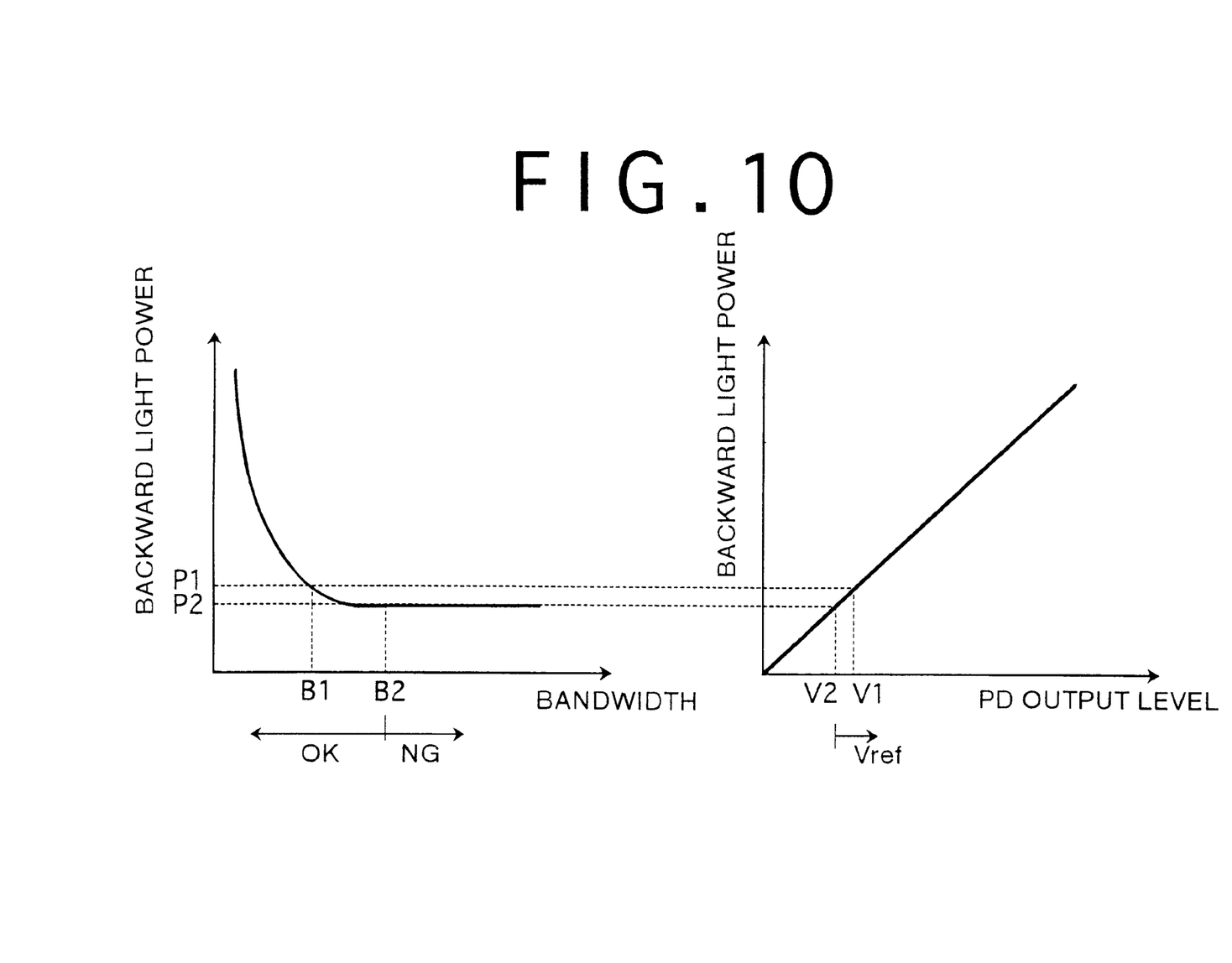
FIG. 10 is an illustration of setting of a bandwidth.

Setting of the bandwidth of the optical signal will now be described with reference to FIG. 10. In FIG. 10, the graph on the left side shows the relation between the power of the backward light and the bandwidth of the optical signal in the case that the power of the optical signal into the optical fiber transmission line 6 is constant. As apparent from this graph, the SBS light decreases with an increase in the bandwidth, and the power of the backward light accordingly decreases. It is assumed that the transmission characteristics in a region above a bandwidth B2 are not good (NG) because of the waveform interference as described in FIG. 7, and that the transmission characteristics in a region below the bandwidth B2 are good (OK). That is, the range a (%) shown in FIG. 7 falls within the OK region, because this range provides allowable transmission characteristics, whereas the range b (%) shown in FIG. 7 falls within the NG region, because this region provides disallowable transmission characteristics.

Thus, the upper limit of the bandwidth in this case is B2. However, if the bandwidth is set excessively small, the transmission distance is limited by SBS as mentioned above. Accordingly, the bandwidth is set so that the power of the backward light is stabilized at a target value P1 slightly larger than a backward light power P2 corresponding to the bandwidth B2. As a result, a constant bandwidth B1 corresponding to the target value P1 can be obtained.

In FIG. 10, the graph on the right side shows the relation between the power of the backward light and the output level of the photodetector 26. As apparent from this graph, the output level of the photodetector 26 increases with an increase in the power of the backward light. The output levels of the photodetector 26 corresponding to the powers P1 and P2 of the backward light becomes V1 and V2, respectively. Under the above conditions, the lower limit of the reference voltage Vref becomes V2, and the constant bandwidth B1 can be obtained by setting the reference voltage Vref equal to V1. In this manner, according to this preferred embodiment, the bandwidth of the optical signal is controlled so that the power of the SBS light included in the backward light becomes substantially constant.

In the case that an optical connector (not shown) provided in the optical fiber transmission line 6 (see FIG. 1) is disconnected, for example, Fresnel reflected light may extremely increase. In this case, there is a possibility that the bandwidth of the optical signal may be unduly extended although SBS light is not so generated, because the bandwidth is controlled so that the power of the backward light becomes constant according to the above-mentioned feedback loop. The limiter circuit 34 serves to prevent such an undue extension of the bandwidth. That is, in the case that the level of the error signal output from the operational amplifier 58 shown in FIG. 8 becomes higher than the predetermined potential (the potential at the connection point between the resistors R2 and R3), the extension of the bandwidth is limited by the limiter circuit 34. Accordingly, the influence of the Fresnel reflected light included in the backward light can be eliminated.

Figure 11:
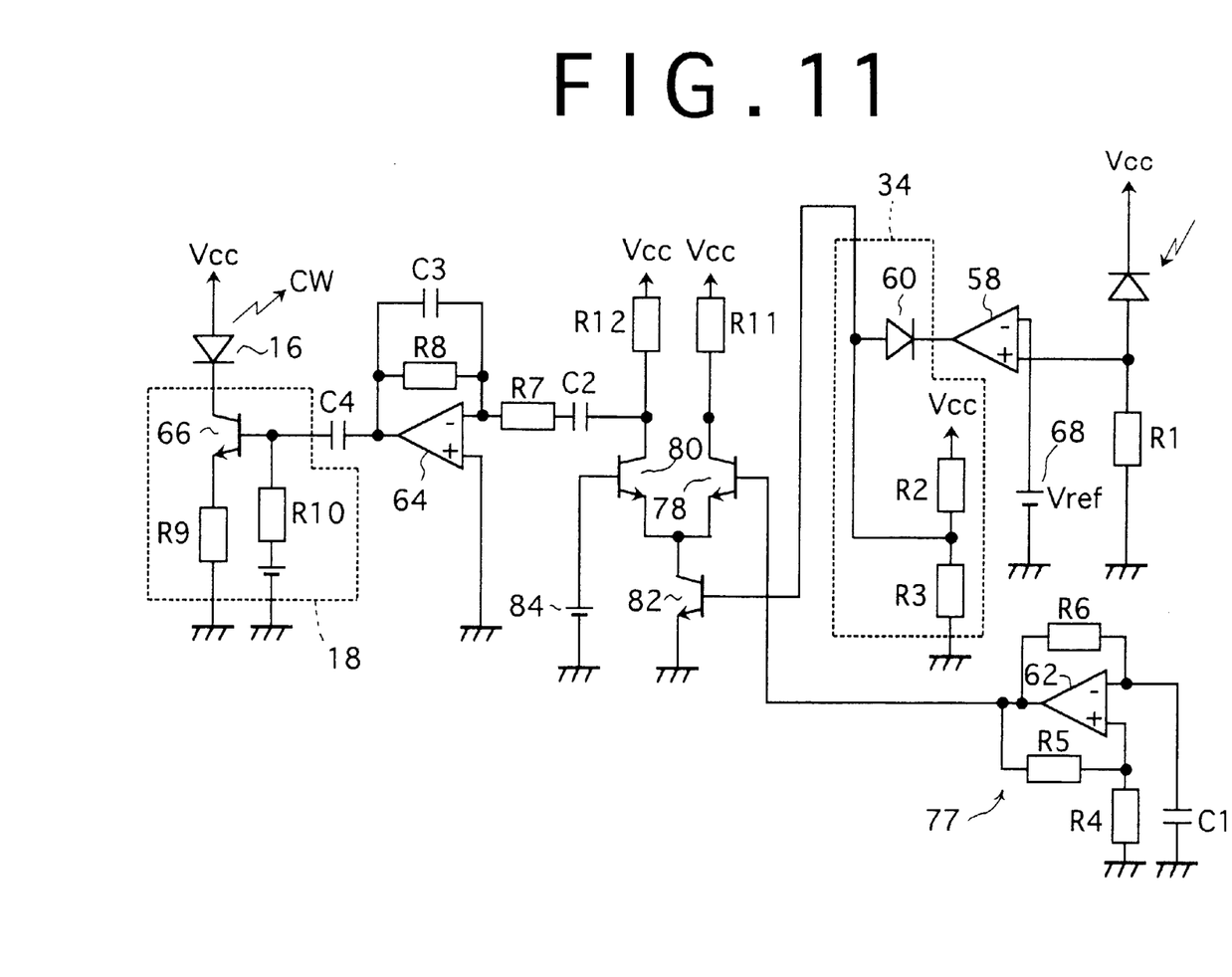
FIG. 11 is a circuit diagram showing a second preferred embodiment of the control circuit shown in FIG. 2.

Referring to FIG. 11, there is shown a second preferred embodiment of the control circuit 24 shown in FIG. 2. In this preferred embodiment, a multivibrator 77 for outputting a rectangular wave having a constant amplitude is used. The multivibrator 77 is the same as the multivibrator shown in FIG. 8 except that a constant power is supplied to the operational amplifier 62.

To change the amplitude of the rectangular wave output from the multivibrator 77, a current switch circuit (limiter amplifier) employing transistors 78, 80, and 82 is used. The rectangular wave is supplied to the base of the transistor 78. The collector of the transistor 78 is connected through a resistor R11 to a voltage line (Vcc), and the emitter of the transistor 78 is connected to the emitter of the transistor 80 and the collector of the transistor 82. The base of the transistor 82 is connected to the anode of the diode 60, and the emitter of the transistor 82 is grounded. The collector of the transistor 80 is connected through a resistor R12 to the voltage line (Vcc), and the base of the transistor 80 is connected to a reference voltage source 84.

The transistors 78 and 80 alternately go on/off according to whether the level of the rectangular wave from the multivibrator 77 is higher or lower than the reference voltage of the reference voltage source 84. Accordingly, the rectangular wave with the level shifted is output from the collector of the transistor 80. This rectangular wave is converted into a triangular wave by the integrating circuit having the operational amplifier 64, and the triangular wave is superimposed on the bias current to be supplied to the laserdiode 16. In this preferred embodiment, the amplitude of the rectangular wave is adjusted by a control signal supplied to the base of the transistor 82.

Also according to this preferred embodiment, the bandwidth of an optical signal is controlled so that the power of SBS light becomes substantially constant. Therefore, good transmission characteristics can be obtained and the suppression of SBS is allowed.

Figure 12:
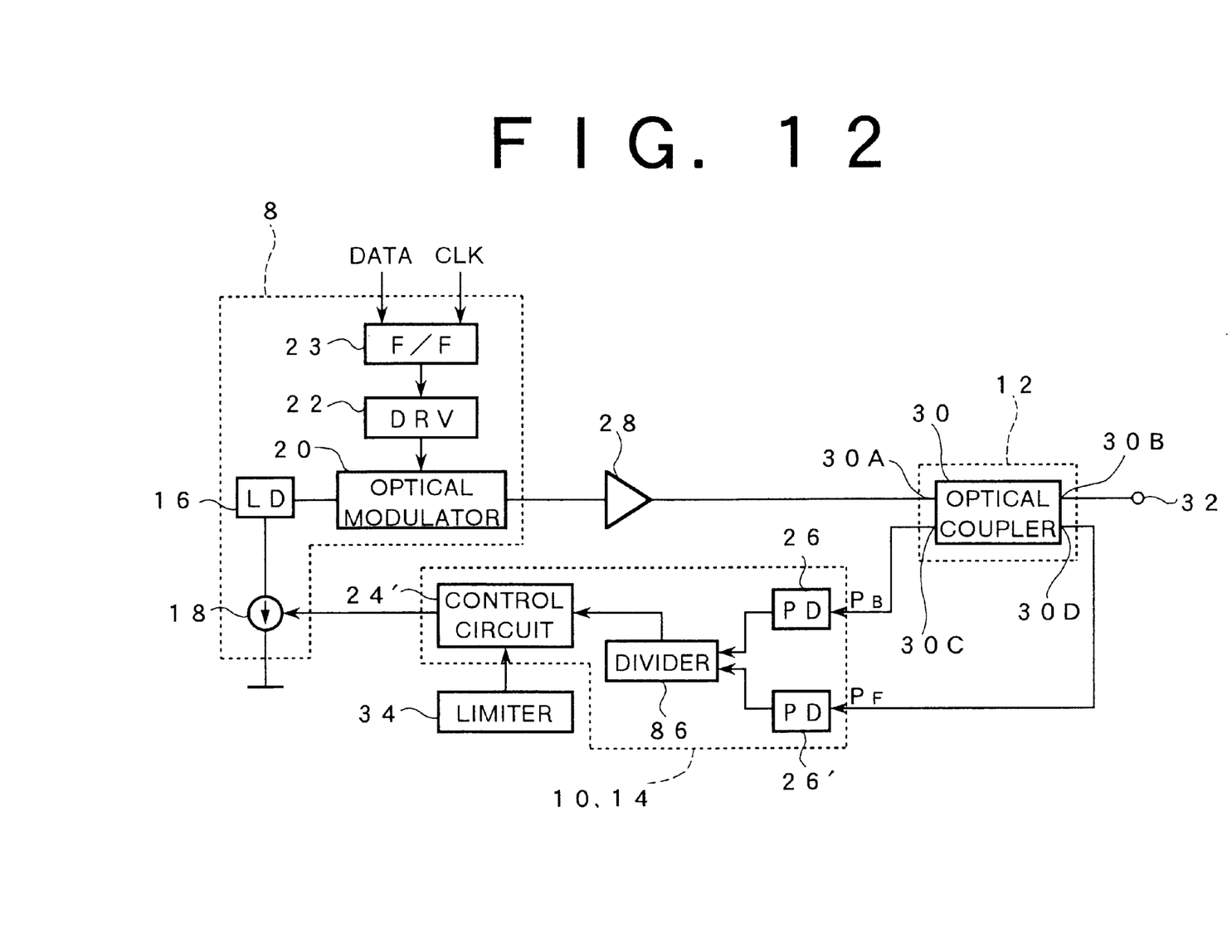
FIG. 12 is a block diagram showing a second preferred embodiment of the optical transmitter according to the present invention.

Referring to FIG. 12, there is shown a second preferred embodiment of the optical transmitter according to the present invention. In contrast with the first preferred embodiment shown in FIG. 2, the second preferred embodiment shown in FIG. 12 is characterized in that it further includes a photodetector 26' for receiving the light from the port 30D of the optical coupler 30. Output signals from the photodetectors 26 and 26' are supplied to a divider 86, in which a ratio in output level between the photodetectors 26 and 26' is obtained. A control circuit 24' then controls the amplitude of a low-frequency signal to be supplied to the constant-current source 18 according to a signal relating to the above ratio output from the divider 86.

The output level of the photodetector 26 corresponds to the power $P_B$ of backward light supplied from the optical fiber transmission line 6 (see FIG. 1) to the output port 32. On the other hand, the output level of the photodetector 26' corresponds to the power $P_F$ of an optical signal forwarded from the output port 32 to the optical fiber transmission line 6. This is due to the fact that the ratio in power between output light from the port 30B of the optical coupler 30 and output light from the port 30D of the optical coupler 30 is constant (1:20, for example).

According to this preferred embodiment, even when the power of CW light output from the laser diode 16 or the power of an amplified optical signal output from the optical amplifier 28 changes, it is unnecessary to change circuit parameters in the control circuit 24'. This will now be described more specifically.

Figure 13:
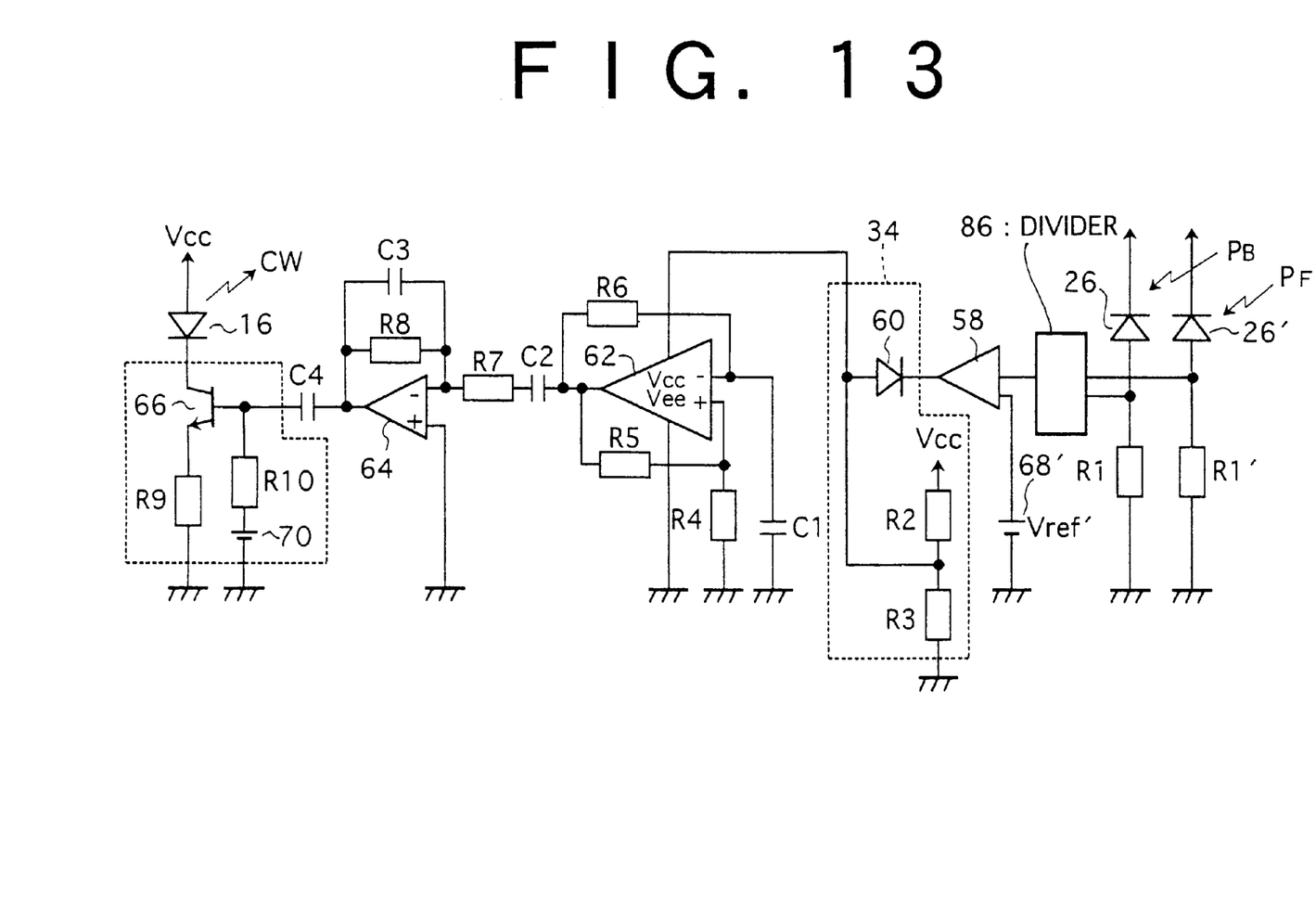
FIG. 13 is a circuit diagram showing a preferred embodiment of a control circuit shown in FIG. 12.

Referring to FIG. 13, there is shown a preferred embodiment of the control circuit 24' shown in FIG. 12. The control circuit 24' has substantially the same configuration as that of the control circuit 24 shown in FIG. 8. Reference numeral R1' denotes a resistor for converting a photocurrent generated in the photodetector 26' into a voltage signal. The signal relating to the ratio ($P_B/P_F$) output from the divider 86 is supplied to the plus input port of the operational amplifier 58, and the minus input port of the operational amplifier 58 is connected to a reference voltage source 68'. A reference voltage Vref' in the reference voltage source 68' may be constant irrespective of the power of light transmitted to the optical fiber transmission line 6 in the forward direction. That is, the power of reflected backward light is substantially proportional to the power of the forward light transmitted to the optical fiber transmission line 6, so that the power of backward light represented by the vertical axis in each of the graphs on the right and left sides in FIG. 10 is changed to the ratio ($P_B/P_F$) on the setting of the bandwidth in this preferred embodiment.

According to this preferred embodiment, it is possible to provide an optical transmitter or an optical communication system which can obtain good transmission characteristics of a main signal with the suppression of SBS, and can also easily set parameters in an electronic circuit (e.g., reference voltage).

The preferred embodiment of the control circuit shown in FIG. 11 may be applied to the optical transmitter shown in FIG. 12

As described above, according to the present invention, it is possible to provide an optical transmitter, an optical communication system, and an optical communication method which can obtain good transmission characteristics of a main signal and allows the suppression of SBS.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical transmitter comprising:
   first means for generating an optical signal having a bandwidth given by a main signal;
   second means for receiving a control signal and modulating said optical signal according to said control signal to extend said bandwidth;
   third means operatively connected to an optical transmission line and said first means, for supplying said optical signal to said optical transmission line and extracting backward light including stimulated Brillouin scattering light generated in said optical transmission line; and
   fourth means for receiving said optical signal and said backward light and generating said control signal so that a ratio between a power of said optical signal and said backward light becomes substantially constant.

2. An optical transmitter according to claim 1, wherein said first means comprises:
   a laser diode,
   means for supplying a bias current to said laser diode so that said laser diode outputs continuous wave light, and
   an optical modulator operatively connected to said laser diode and intensity modulating said continuous wave light by said main signal to generate said optical signal.

3. An optical transmitter according to claim 1, wherein:
   said third means comprises an optical coupler including a first port operatively connected to said first means, a second port operatively connected to said optical transmission line, and a third port outputting said backward light; and
   said fourth means includes a first photodetector operatively connected to said third port.

4. An optical transmitter according to claim 1, further comprising an optical amplifier operatively connected between said first means and said third means.

5. An optical transmitter comprising:
   first means for generating an optical signal having a bandwidth given by a main signal;
   second means for receiving a control signal and modulating said optical signal according to said control signal to extend said bandwidth said second means comprising:
     oscillating means for generating a low-frequency signal having a frequency lower than that of said main signal,
     means for modulating said optical signal so that a wavelength of said optical signal changes in synchronism with said low-frequency signal, and
     means for controlling a range of change in the wavelength of said optical signal according to said control signal;
   third means operatively connected to an optical transmission line and said first means, for supplying said optical signal to said optical transmission line and extracting backward light including stimulated Brillouin scattering light generated in said optical transmission line; and fourth means for receiving said optical signal and said backward light and generating said control signal so that a ratio between a power of said optical signal and said backward light becomes substantially constant.

6. An optical transmitter according to claim 5, wherein: said oscillating means comprises a multivibrator outputting a rectangular wave, and an integrating circuit inputting said rectangular wave; and said low-frequency signal is output as a triangular wave from said integrating circuit.

7. An optical transmitter comprising:

first means for generating an optical signal having a bandwidth given by a main signal;

second means for receiving a control signal and modulating said optical signal according to said control signal to extend said bandwidth;

third means operatively connected to an optical transmission line and said first means, for supplying said optical signal to said optical transmission line and extracting backward light including stimulated Brillouin scattering light generated in said optical transmission line, said third means comprising:

an optical coupler including:
  a first port operatively connected to said first means,
  a second port operatively connected to said optical transmission line,
  a third port outputting said backward light, and
  a fourth port outputting a part of said optical signal; and fourth means for receiving said optical signal and said backward light and generating said control signal so that a ratio between a power of said optical signal and said backward light becomes substantially constant, said fourth means including:

a first photodetector operatively connected to said third port,
a second photodetector operatively connected to said fourth port, and
a divider receiving output signals from said first and second photodetectors.

8. An optical transmitter comprising:

first means for generating an optical signal having a bandwidth given by a main signal;

second means for receiving a control signal and modulating said optical signal according to said control signal to extend said bandwidth;

third means operatively connected to an optical transmission line and said first means, for supplying said optical signal to said optical transmission line and extracting backward light including stimulated Brillouin scattering light generated in said optical transmission line;

fourth means for receiving said optical signal and said backward light and generating said control signal so that a ratio between a power of said optical signal and said backward light becomes substantially constant; and a limiter limiting an extension of said bandwidth by said second means, whereby an influence of Fresnel reflected light included in said backward light is eliminated.

9. An optical communication system comprising an optical transmitter, an optical receiver, and an optical transmission line connecting said optical transmitter and said optical receiver, said optical transmitter comprising:

first means for generating an optical signal having a bandwidth given by a main signal;

second means for receiving a control signal and modulating said optical signal according to said control signal to extend said bandwidth;

third means operatively connected to said optical transmission line and said first means, for supplying said optical signal to said optical transmission line and extracting backward light including stimulated Brillouin scattering light generated in said optical transmission line; and fourth means for receiving said optical signal and said backward light and generating said control signal so that a ratio between a power of said optical signal and said backward light becomes substantially constant.

10. An optical communication method comprising the steps of:

(a) generating an optical signal having a bandwidth given by a main signal;

(b) modulating said optical signal to extend said bandwidth;

(c) supplying said optical signal to an optical transmission line;

(d) extracting backward light including stimulated Brillouin scattering light generated in said optical transmission line; and (e) controlling said bandwidth to be extended in said step (b) so that a ratio between a power of said optical signal and said backward light becomes substantially constant.

11. An optical transmitter comprising:

a first unit generating an optical signal having a bandwidth given by a main signal;

a second unit receiving a control signal and modulating said optical signal according to said control signal to extend said bandwidth;

a third unit operatively connected to an optical transmission line and said first unit, supplying said optical signal to said optical transmission line and extracting backward light including stimulated Brillouin scattering light generated in said optical transmission line; and a fourth unit receiving said optical signal and said backward light and generating said control signal so that a ratio between a power of said optical signal and said backward light becomes substantially constant.

12. An optical communication system comprising an optical transmitter, an optical receiver, and an optical transmission line connecting said optical transmitter and said optical receiver, said optical transmitter comprising:

a first unit generating an optical signal having a bandwidth given by a main signal;

a second unit receiving a control signal and modulating said optical signal according to said control signal to extend said bandwidth;

a third unit operatively connected to said optical transmission line and said first unit, supplying said optical signal to said optical transmission line and extracting backward light including stimulated Brillouin scattering light generated in said optical transmission line; and a fourth unit receiving said optical signal and said backward light and generating said control signal so that a ratio between a power of said optical signal and said backward light becomes substantially constant.

* * * * *